(12) United States Patent
Michel

(10) Patent No.: US 6,470,792 B1
(45) Date of Patent: Oct. 29, 2002

(54) COMBINED COMPRESSION AND OIL SCRAPER PISTON RING

(75) Inventor: Hans-Albert Michel, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 09/662,853

(22) Filed: Sep. 15, 2000

(30) Foreign Application Priority Data

Sep. 16, 1999 (DE) .......................... 199 44 453

(51) Int. Cl.[7] .................................. F16J 1/04
(52) U.S. Cl. ......................................... 92/208
(58) Field of Search ................... 92/172, 208; 277/434, 277/438, 448, 460, 479, 502, 578

(56) References Cited

U.S. PATENT DOCUMENTS

| | | | |
|---|---|---|---|
| 1,613,410 A | | 1/1927 | Post |
| 2,459,395 A | * | 1/1949 | Smith .......................... 277/460 |
| 5,618,046 A | * | 4/1997 | Binford ....................... 277/163 |
| 5,779,243 A | * | 7/1998 | Hanlon ........................ 277/216 |

FOREIGN PATENT DOCUMENTS

| | | |
|---|---|---|
| DE | 25 13 324 | 10/1976 |
| DE | 35 11 851 | 10/1986 |
| DE | 39 40 301 | 6/1991 |
| DE | 44 29 649 | 2/1996 |
| DE | 198 10 309 | 9/1998 |
| EP | 0 253 069 | 1/1988 |
| JP | 06-137428 A * | 5/1994 .................. 277/460 |

* cited by examiner

*Primary Examiner*—Edward K. Look
*Assistant Examiner*—Igor Kershteyn
(74) *Attorney, Agent, or Firm*—Venable; Norman N. Kunitz

(57) ABSTRACT

A piston ring includes a first radial flank; a second radial flank; and an outer rounded circumferential surface constituting a contact face of the piston ring. The rounded face has a circumferential crest line situated at a distance from the first radial flank which is more than one half of the axial piston ring height. The piston ring further has facing end surfaces defining a ring gap; and a circumferential groove provided in the outer rounded circumferential surface and extending axially from the second radial flank to the crest. The circumferential groove terminates adjacent each end surface at a distance therefrom.

3 Claims, 1 Drawing Sheet

COMBINED COMPRESSION AND OIL SCRAPER PISTON RING

CROSS REFERENCE TO RELATED APPLICATION

This application claims the priority of German Application No. 199 44 453.6 filed Sep. 16, 1999, which is incorporated herein by reference.

BACKGROUND OF THE INVENTION

This invention relates to a piston ring to be seated in the top circumferential groove of a piston of an internal-combustion engine. The piston ring has a rounded contact face, whose crest line is situated by more than one-half of the axial piston ring height underneath the radial piston ring flank oriented towards the piston crown.

German Offenlegungsschrift (application published without examination) 39 40 301 describes a piston ring of the above-outlined construction. The contact face of the piston ring has an asymmetrical rounded (convex) contour. Piston rings of this type are seated in the top and second piston grooves and are designated as compression rings.

Conventionally, pistons for internal-combustion engines are provided with a piston ring set composed of a first and a second compression ring and an oil control (oil scraper) ring.

In the endeavor to best adapt the individual piston rings to their assigned tasks, a great number of piston ring constructions have been known. Thus, German Patent No. 4,429,649 describes a special rounded contour for a compression piston ring. The piston ring is designed to be particularly wear resistant. Piston rings intended to be seated in the top piston groove have been designed up to now such that they engage the cylinder wall with a high surface pressure.

Measures which are directed to improve the oil scraping effect have been provided only for piston rings seated in the second or third piston groove.

SUMMARY OF THE INVENTION

It is an object of the invention to provide a piston ring for the top piston groove which is improved with respect to its oil scraping effect.

This object and others to become apparent as the specification progresses, are accomplished by the invention, according to which, briefly stated, the piston ring includes a first radial flank, a second radial flank; and an outer rounded circumferential surface constituting a contact face of the piston ring. The rounded surface has a circumferential crest line situated at a distance from the first radial flank which is more than one half of the axial piston ring height. The piston ring further has facing end surfaces defining a ring gap; and a circumferential groove provided in the outer rounded circumferential surface and extending axially from the second radial flank to the crest. The circumferential groove terminates adjacent each end surface at a distance therefrom.

By virtue of the special configuration of the contact face (running face) of the piston ring, a combination piston ring is provided which functions as a compression ring as well as an oil scraping ring. That region of the contact face of the piston ring which is closer to the piston crown functions as the compressing part whereas the ring region more remote from the piston crown operates as an oil scraping part.

DESCRIPTION OF THE PREFERRED EMBODIMENT

Figure 1:
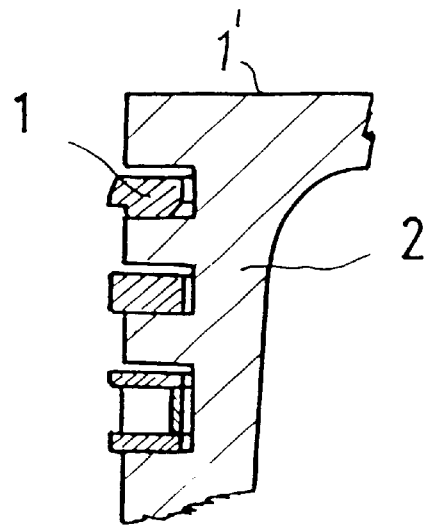
FIG. 1 is an axial sectional fragmentary view of a piston showing three piston rings in an installed state, wherein the piston ring seated in the top groove is constructed according to the invention.

FIG. 1 illustrates a piston ring 1 according to the invention, seated in the top circumferential groove of the piston 2 and functioning as a compression ring.

Figure 2:
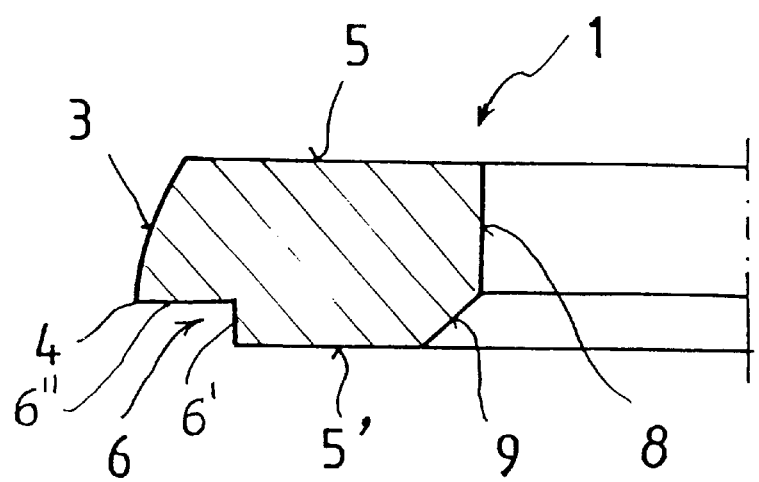
FIG. 2 is an axial sectional view of a symmetrical half of the piston ring according to the invention.

Also referring to FIG. 2, the piston ring 1 has a rounded circumferential contact face 3. The crest 4 of the rounded contact face 3 is situated by more than half of the axial piston ring height underneath the radial piston ring flank 5 oriented towards the piston crown 1'. The piston ring 1 has a further radial flank 5' oriented away from the piston crown 1'. The axial height of the piston ring is determined by the distance between the flanks 5, 5'.

Starting from the radial piston ring flank 5', the piston ring 1 has a circumferential groove 6 having a bottom wall 6' and a sole side wall 6" which terminates at the crest 4. The side wall 6" has a height which determines the radially measured depth of the groove 6 which is greater than 0.5 mm. In its axially measured width the groove 6 extends from the flank 5' to the crest 4.

Figure 3:
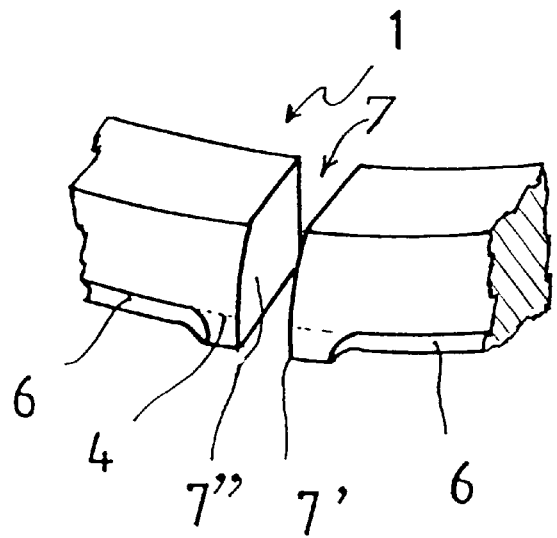
FIG. 3 is a fragmentary perspective view of the piston ring according to the invention shown in the region of the piston ring gap.

FIG. 3 illustrates the piston ring region in the gap 7 defined by the facing end surfaces 7', 7" of the piston ring 1. At the end surfaces 7', 7" the groove 6 is discontinued, that is, it does not break through the end surfaces 7', 7". Stated differently, the groove 6 terminates adjacent each end surface 7', 7" at a distance therefrom.

Reverting to FIG. 2, to ensure that the piston ring 1 is not twisted in the top groove, the inner circumferential ring face 8 is provided with a frustoconical face 9 (chamfer) at the radial ring flank 5'. The size of the chamfer 9 is dimensioned such that the piston ring 1 lies parallel to the groove flanks in the installed state.

It will be understood that the above description of the present invention is susceptible to various modifications, changes and adaptations, and the same are intended to be comprehended within the meaning and range of equivalents of the appended claims.

What is claimed is:

1. A piston for an internal combustion engine comprising
   (a) a crown;
   (b) a plurality of axially spaced circumferential piston grooves; and
   (c) separate piston rings seated in respective said piston grooves; one of the piston rings comprising
      (1) a first radial flank;
      (2) a second radial flank; said first radial flank being closer to said crown than said second radial flank; a distance between the first and second flanks determining an axial height of the piston ring;
      (3) an outer rounded circumferential surface constituting a contact face of the piston ring; said rounded surface having a circumferential crest situated at a distance from said first radial flank; said distance from said first radial flank being more than one half of said axial height;
      (4) facing end surfaces defining a ring gap;
      (5) a circumferential groove provided in said outer rounded circumferential surface and extending axially from said second radial flank to said crest; said circumferential groove terminating adjacent each end surface at a distance therefrom;

(6) an inner circumferential surface; and (7) a circumferential chamfer provided on said inner circumferential surface; said chamfer extending to said second radial flank.

2. The piston as defined in claim 1, wherein one of said piston grooves is a top groove closest to said crown; wherein said one piston ring is a top piston ring seated in said top groove.

3. The piston as defined in claim 2, wherein said circumferential groove of said top piston ring has a radially measured depth which is more than 0.5 mm.

* * * * *